(12) United States Patent
Hunt et al.

(10) Patent No.: US 8,730,804 B2
(45) Date of Patent: May 20, 2014

(54) OVERLOAD CONTROL IN A COMMUNICATIONS NETWORK

(75) Inventors: Rowlan G Hunt, Ipswich (GB); Martin J Whitehead, Woodbridge (GB)

(73) Assignee: British Telecommunications public limited company, London (GB)

( * ) Notice: Subject to any disclaimer, the term of this patent is extended or adjusted under 35 U.S.C. 154(b) by 222 days.

(21) Appl. No.: 10/588,726

(22) PCT Filed: Feb. 21, 2005

(86) PCT No.: PCT/GB2005/000633
§ 371 (c)(1),
(2), (4) Date: Aug. 8, 2006

(87) PCT Pub. No.: WO2005/084041
PCT Pub. Date: Sep. 9, 2005

(65) Prior Publication Data
US 2007/0171823 A1    Jul. 26, 2007

(30) Foreign Application Priority Data

Feb. 25, 2004 (GB) .................................. 0404196.8
Mar. 23, 2004 (GB) .................................. 0406513.2

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ....................................................... 370/232

(58) Field of Classification Search
USPC .......... 455/453; 370/229, 230, 231, 232, 234, 370/235, 236
See application file for complete search history.

(56) References Cited

U.S. PATENT DOCUMENTS

| | | | |
|---|---|---|---|
| 4,224,479 A | 9/1980 | Crawford | |
| 5,295,183 A | 3/1994 | Langlois et al. | |
| 5,878,224 A * | 3/1999 | Smith | 709/224 |
| 6,018,519 A * | 1/2000 | Ginzboorg | 370/236 |
| 6,243,449 B1 * | 6/2001 | Margulis et al. | 379/112.04 |
| 6,259,776 B1 | 7/2001 | Hunt | |
| 6,347,077 B1 * | 2/2002 | Ginzboorg | 370/230 |
| 6,542,466 B1 | 4/2003 | Pashtan et al. | |
| 6,792,099 B1 * | 9/2004 | Na | 379/221.09 |
| 6,870,922 B1 * | 3/2005 | Snape | 379/221.12 |
| 7,107,061 B1 * | 9/2006 | Tontiruttananon et al. | 455/453 |
| 2006/0039397 A1 * | 2/2006 | Hari et al. | 370/431 |

FOREIGN PATENT DOCUMENTS

| | | | |
|---|---|---|---|
| EP | 0 425 202 A2 | 10/1990 | |
| EP | 1 024 637 A1 | 8/2000 | |
| EP | 1024637 A1 | 8/2000 | |
| WO | 97/33440 | 9/1997 | |
| WO | 98/43451 | 10/1998 | |

OTHER PUBLICATIONS

Whitehead, M. J., et al., "Adaptive network overload controls," BT Technology Journal, vol. 20, No. 3, Jul. 2002, pp. 31-54; XP-001127502.
International Search Report mailed Sep. 20, 2005 in PCT/GB2005/000633.
European Examination Report dated Aug. 24, 2007 in EP 05717762.8.
PCT Preliminary Report on Patentability dated Aug. 30, 2006.
Whitehead et al., "Adaptive Network Overload Controls", BT Technology Journal, BT Laboratories, GB, vol. 20, No. 3, Jul. 2002, pp. 31-54, XP001127502 ISSN: 1358-3948.
Substantive Examination Report issued Mar. 6, 2009 in CN 2005800061682 with English translation.

* cited by examiner

Primary Examiner — Huy D Vu
Assistant Examiner — Adnan Baig
(74) Attorney, Agent, or Firm — Nixon & Vanderhye P.C.

(57) ABSTRACT

An adaptive overload system for controlling the amount of traffic processed by a network access controller is described for a network access controller arranged to control a plurality of network access points. Each network access point provides traffic with access to the communications network and the system comprises determining at the network access controller if an overload condition exists, and if so, generating at least one global constraint to restrict the rate at which a network access point admits said traffic to the communications network. The controller then multicasts at least one global traffic constraint to one or more of said plurality of network access points. Each network access point receiving the global constraint then processes the global traffic constraint to determine a plurality of local constraint conditions. The receiving network access point performs the following steps to determine said local constraint conditions: determining a local predetermined gap interval to be imposed on said traffic; and determining an initial gap interval which differs from the subsequent local predetermined gap intervals, the initial gap intervals differing between each of said plurality of network access points. The initial gap intervals are determined in either a random or pseudo-random manner to ensure synchronization effects at the network access controller which would otherwise occur in high call rate scenarios are removed.

24 Claims, 14 Drawing Sheets

OVERLOAD CONTROL IN A COMMUNICATIONS NETWORK

BACKGROUND

1. Technical Field

This application is the US national phase of international application PCT/GB2005/000633 filed 21 Feb. 2005 which designated the U.S. and claims benefit of GB 0404196.8 and GB 0406513.2, dated 25 Feb. 2004 and 23 Mar. 2004, respectively, the entire content of which is hereby incorporated by reference.

The present invention relates to overload control in a communications network, particularly but not exclusively to an external overload control system for a Media Gateway Controller (MGC) to restrict the rate at which offered calls are received by the MGC from Media Gateways (MGs) in a VoIP network.

2. Related Art

Tele-voting (in which a telephone number is broadcast for users to call to register their vote) and similar mass calling schemes often result in very high call rates which have a sudden onset and which last for a relatively short duration. It is not economic to provision sufficient network capacity to cope with such overwhelming surges in traffic, necessitating overload control to be implemented within the communications network to enable emergency and other core services to be supported. However, traditional methods to cope with sudden surges in the number of calls sent to a specific network address are not satisfactory as the communications networks themselves evolve.

Conventional methods of providing overload control in a communications network include call gapping techniques which seek to limit the number of calls made. Such call gapping techniques are well known to those skilled in the art and involve barring or blocking calls received within a predetermined interval of time (the gap) following a first call which triggers the onset of the gap. An example of a call-gapping technique is described for example in U.S. Pat. No. 6,259,776 entitled "System for controlling telecommunications overload traffic", the contents of which are hereby deemed incorporated into the description by reference.

However, traditional telecommunications networks are evolving to offer more functionality and to support differing media from that offered by conventional public switched telephone networks (PSTNs). For example, call concentrators in PSTNs can be replaced by access media gateways (MGs) which convert conventional copper line to provide access to Internet Protocol (IP) media transport. In such communications networks, the MGs are controlled by Media Gateway Controllers (MGCs) which perform a traffic analysis role by analysing dialled digits to determine the routing of calls, analogous to the local exchange processors implemented in conventional PSTNs. More details on MGs and MGCs can be found from the Media Gateway Control (MEGACO) Charter standard documentation available from the Internet Engineering Task Force (IETF) standardisation body (url http://www.ietf.org/html.charters/megaco-charter.html).

Whenever a destination telephone number is advertised on a national basis and a significant number of customers attempt to make a call to the telephone number, a focused overload of calls seeking to use incoming trunks to the destination main switching unit and/or the destination local exchange can result in switch blocking of normal service traffic. Several techniques have been proposed to deal with such problems within conventional PSTNs, such as U.S. Pat. No. 6,259,776 proposes for example. U.S. Pat. No. 6,259,776 describes a telecommunications network including an overload control arrangement in which the overload control arrangement restricts call connections to a predetermined destination when traffic to such a destination exceeds a predetermined level. The arrangement comprises a plurality of identical overload control functions each running in a respective one of a plurality of nodes of the network and each having a respective gapping period determined from the perceived overload level at the respective node, the overload control functions exchanging data defining their respective gapping periods and effecting adjustment towards an average gapping period so that substantial differences between respective gapping periods from respective nodes to any one predetermined destination are avoided.

Whilst the overload control system described in U.S. Pat. No. 6,259,776 provides an effective solution in a conventional telecommunications SS7-type network, however, it is less effective for communications over an Internet Protocol (IP) network or similar type of network where a large number of network access points $A_1 \ldots A_N$) may be under the control of a single network access controller $X_1$, such as FIG. 1 of the accompanying drawings shows. In such situations, the critical overload condition for the network is related to the maximum call processing capacity of the controller $X_1$, which has only a finite amount of resources available to process calls seeking admission to the network. This limitation on the number of calls admitted to the network is shown schematically in FIG. 2 of the accompanying drawings.

In the graph shown in FIG. 2 the x-axis represents the rate of calls offered to the network access controller by the network access points and the y-axis represents the number of calls admitted by the network access controller to the network. The total number of aggregated calls offered by all of the access points $A_1 \ldots A_N$ which are actually admitted by the controller $X_1$ to the communications network as a function of the aggregated offered rate is shown by the solid line plot (thus this shows the rate of calls admitted to the network). Where the offered rate is relatively low, the admission rate is able to rise to match the number of calls offered. However, the controller has only finite resources and as the use of its resources increases, eventually the controller becomes overloaded. This occurs at the point marked A in FIG. 2, and at this point, the controller needs to reject a certain proportion of off-hook signals received to enable response times to remain relatively low.

As the number of new calls offered per second, i.e. as the offered call rate, increases beyond point A, the admission rate fails to rise as sharply, and finally the admission rate for calls to the network reaches a maximum for a given rate of offered calls $L_M$. Beyond this point, the resources of the controller become increasingly involved with rejecting offered calls as opposed to admitting calls. Eventually, when the number of offered calls reaches rate $L_C$ all of the controller's resources will be occupied in rejecting calls, and no new calls will be admitted.

The network access controller's internal control mechanisms are reflected in the diagram shown in FIG. 2. The access controller's internal control provides the ability to reject some or all of the offered load, and provides no ability to regulate any external restriction (such as gapping) on the offered load.

The dashed curve in FIG. 2 shows the response time of the network access controller to the signals (for example, off-hook signals) that it receives from the network access points within its domain of control. Initially, prior to the overload point being reached, the controller will have a slowly rising response time as it steadily processes more and more offered calls. The ability of the access controller to reject offered calls needs to be coupled with an effective external restriction if the access controller is to regulate its response times. Whenever the traffic offered to the network access points exceeds $L_M$ it is necessary to implement some form of adaptive external restriction control to ensure the rate offered to the access controller is held relatively close to $L_M$ to maximise the access controller's throughout.

One form of adaptive external control known to those skilled in the art is that provided by a call gapping overload system. The call gapping process enables the load offered by the network access points to the access controller to remain around $L_M$ which enables the access controller's response time to remain relatively constant. However, if no external control is implemented, or if the external control is not sufficient to limit the offered call rate to the vicinity of $L_M$, then if the offered rate rises until it approaches $L_C$, the internal overload control process implemented by the overload controller will effectively reduce the access controller's throughput to zero, which would result in none of the offered traffic being admitted to the network.

Conventional call gapping processes also have other limitations. For example, if the process is applied within a system in which a large number of network access control points are controlled by a single access controller (also known to those in the art as a very high "fan-in"), the rate at which traffic is admitted by the external restriction (i.e. applied by the network access points) responds too slowly to commands from the control point to change the admitted rate (i.e. to change the gap interval if a gapping process is used to implement the external restriction). This slow response by the network access points results in the overload control servo loop being slow and possibly unstable.

Other sources of delay contributing to this slow response problem include:

delay in sending control messages out from the access controller to the network access points due to the large number of control messages which need to be sent;

the first offered call always being admitted by the external restriction in a conventional call gapping process when a call restriction is being initially imposed, which then generates a synchronisation effect if all of the network access points then have concurrently running active interval timers imposing a call gap; and if a gap interval update is applied to an access point which is already being gapped, the delay waiting for an existing gap interval timer to expire before the updated gap can have an effect on the admitted rate.

Thus the techniques imposed by conventional call gapping are no longer effective in situations where the critical overload condition occurs at an access controller which controls a number of access points, and more preferably a very large number, for example, several thousand.

BRIEF SUMMARY

One object of the invention seeks to provide an adaptive external overload control scheme for a communications network in which an access controller controls a plurality of network access points arranged to admit traffic to the communications network. In particular, one object of the invention seeks to mitigate and/or obviate the problems which may occur when an access controller such as a Media Gateway Controller (MGC) detects an overload condition by providing an overload control system for the network which prevents a focussed overload of calls at the access controller. In particular, an overload control system which prevents synchronised repeat focussed overloads from occurring within the network. Here the term "focussed overload" refers to traffic whose processing for admittance to the network is focussed on a particular access controller, as opposed to controlling the overload at its focus destination (if the majority of calls are directed to a particular address or part of an address within the network). The traffic itself may comprise voice and/or data traffic (e.g. small message service (SMS) or electronic mail type traffic).

Another object of the invention seeks to provide an overload control system in which an access controller externally regulates its offered call rate by multicasting a scalable call gap interval determined by the access controller to a number of network access points arranged to offer calls to the access controller. Each network access point is then able to modify the scalable call gap according to their individual characteristics. Examples of individual characteristics of a network access point include, for example, the number of lines along which the access point receives traffic seeking admittance to the network.

Yet another object of the invention seeks to regulate traffic according to the particular network destination address of the traffic as it is admitted by each network access point.

The aspects and preferred features of the invention are as provided in the accompanying claims.

Advantageously, the invention seeks to provide an adaptive overload system for controlling the amount of traffic processed by a network access controller arranged to control a plurality of network access points. Each network access point provides traffic with access to the communications network and the system comprises determining at the network access controller if an overload condition exists, and if so, generating at least one global constraint to restrict the rate at which a network access point admits said traffic to the communications network. An example of a global constraint comprises a requested rate per access line managed by the access point. The global constraint is thus determined for all of the network access points by the access controller determining that the rate at which traffic is being offered to the access controller for processing has exceeded a predetermined cut-off. A global constraint generated by the controller may be specifically for traffic whose destination comprises a particular address. Alternatively, a global constraint generated by the network access controller may instead comprise a default global constraint to be applied to traffic independently of the destination address of the traffic. The controller then communicates the at least one global traffic constraint to one or more of said plurality of network access points. It is preferable if the communication technique employed is a multi-casting (or broadcasting) type of technique.

Each network access point receiving the global constraint then processes the global traffic constraint to determine a plurality of local constraint conditions. The receiving network access point performs the following steps to determine said local constraint conditions: determining a local predetermined gap interval to be imposed on said traffic; and determining an initial gap interval which differs from the subsequent local predetermined gap intervals, the initial gap intervals differing between each of said plurality of network access points. The initial gap intervals are determined in either a random or pseudo-random manner to ensure synchronisation effects at the network access controller which would otherwise occur in high call rate scenarios are removed.

The initial gap intervals are applied immediately, without the need to be triggered by a call arriving. If a zero initial gap interval is applied, then the next call to be received by the media gateway will trigger the imposition of a standard gap interval.

The remaining aspects of the invention are provided by the accompanying independent claims and the preferred features are recited by the dependent claims thereon. The preferred features may be suitably combined with any of the aspects of the invention where the suitable combination is apparent to those skilled in the art.

Thus invention provides a method of controlling the rate at which traffic seeking access to a communications network is processed by an access controller, and more specifically to a method of controlling the offered call rate at a media gateway controller. Advantageously, the rate of admission at each access points within the domain of control of an access controller can be changed dynamically and nearly instantaneously in response to a restriction requested by the access controller.

BRIEF DESCRIPTION OF THE DRAWINGS

The invention will now be described with reference to the accompanying drawings which are by way of example only and in which.

DETAILED DESCRIPTION OF EXEMPLARY EMBODIMENTS

The best mode of the invention as currently contemplated by the inventor(s) will now be described with reference to the accompanying drawings. Those skilled in the art will realise that the embodiments described in detail below are exemplary only and that where alternatively features and steps apparently equivalent to those described in the text exist, these equivalents are considered to be implicitly included as alternatives to such features in the description. The scope of the invention is therefore to be determined by the accompanying claims. In particular, where reference is made to a "call" this term should be interpreted to include not just voice calls, but any other form of communication (for example, a small text messaging service call and/or an instant messaging call and/or an electronic mail call) where the form of communication is known to those skilled in the art as capable of being converted into a form which can be supported by the network and processed in an equivalent manner by an network access point and/or an access controller in the network to the way in which a conventional call would be processed. Similarly, the term "traffic" includes "calls" which may comprise voice traffic within a VoIP network, or other forms of communication traffic such as small messaging service (sms) text message traffic, electronic mail traffic, instant messaging traffic etc as described above. Thus, as has been stated above, although the invention will be described primarily in terms of voice calls, those skilled in the art will appreciate that the term "call" is intended to cover traffic which comprise other media such as electronic mail or sms text messages, which can create focussed surges within the network as a large number of "callers" seek to communicate with one or more addresses.

Figure 1:
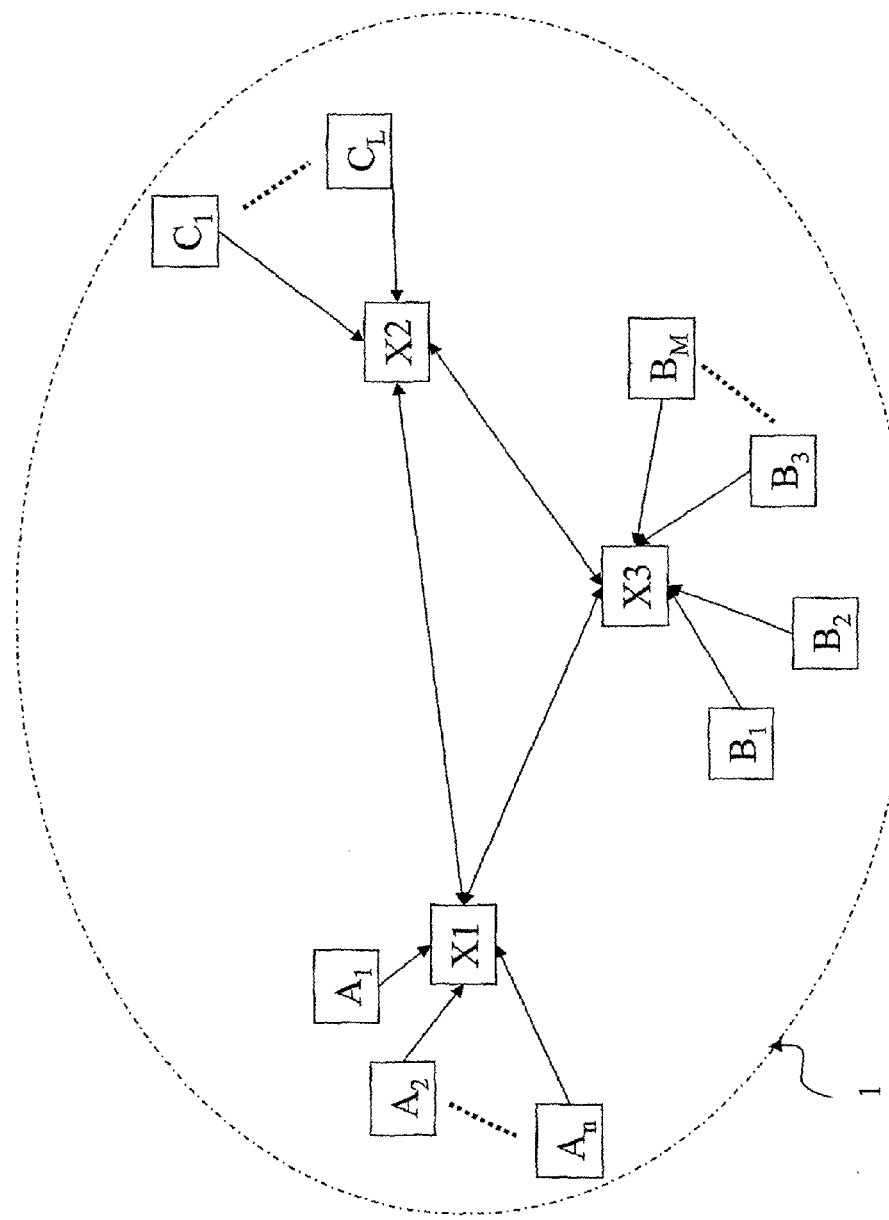
FIG. 1 shows a schematic diagram of a communications network.

Returning to FIG. 1 of the accompanying drawings, a communications network 1 is shown to which access is provided by a number of network access points $A_1 \ldots A_N, B_1 \ldots B_M, C_1 \ldots C_L$. Access to the communications network 1 via the access points $A_1 \ldots A_N, B_1 \ldots B_M, C_1 \ldots C_L$ is controlled by one or more access controllers, for example access controllers $X_1, X_2, X_3$. As shown in FIG. 1 network access via $A_1 \ldots A_N$ is controlled by $X_1$, network access via $B_1 \ldots B_M$ is controlled by $X_2$ etc. Typically, the number of access points controlled by an individual access controller will be relatively high, for example, several hundred access points (and upwards) may be controlled by a single access controller. Not shown in FIG. 1 is the fact that each access point may be connected to a differing number of incoming lines, thus access point $A_1$ may be connected to only one line, but access point $A_2$ may be connected to twenty five lines etc. A single access controller such as $X_1$ may therefore have a number of different types of access points to control within the domain of its control, the network access points differing not only in the number of lines for which they provide access to the network, but also otherwise, such as in their capacity etc.

In one embodiment of the invention, the communications network comprises an Internet Protocol network, and the network access points comprise Media Gateways (MGs) which can support the conversion of voice traffic to IP traffic, thus enabling a Voice over IP (VoIP) service to be supported. The rate at which traffic (equivalently calls) is admitted to the IP communications network is regulated by one or more network access controllers. In this embodiment, each network access controller comprises a Media Gateway Controller (MGCs).

More generally, the term "network access point" refers to a point within the domain of the communications network which functions to provide access to the communications network from another network, and the term "network access controller" refers to a point within the communications network domain which provides a control function for the network access point.

The Media Gateway Control Protocol Architecture and Requirements standard document RFC 2805, the MEGACO protocol RFC 2885 (now obsoleted by RFC 3015), the Megaco Errata RFC 2886 (now obsoleted by RFC 3015), the Megaco Protocol (with errata folded in) RFC 3015 now obsoleted by RFC 3525, and the Megaco IP Phone Media Gateway Application Profile (RFC 3054) and Gateway Control Protocol Version 1 (RFC 3525) form collectively some of the MEGACO standard literature relating to the implementation of media gateway control and describe formal definitions for the terms media gateway controllers and media gateways. The standards documentation described above is all available via the MEGACO charter accessible from the IETF standards forum web-site (url: www.ietf.org). An equivalent standard supporting the Media Gateway Control Protocol is provided by International Telecommunications Union ITU-T H.248.1

These standards define the Media Gateway (MG) function as providing a media mapping and/or transcoding function between potentially dissimilar networks, one of which is presumed to be a packet, frame or cell network. As an example, a MG might terminate switched circuit network (SCN) facilities (trunks, loops), packetize the media stream (where not already packetized), and deliver packetized traffic to a packet network. An MG may also be configured to interface a packet (e.g. VoIP) network to a two-line wire analogue copper telephone transmission line or even to another packet (e.g. ATM) network which carries a multiplex of access lines by "loop emulation". The MG performs these functions in the reverse order for media streams flowing from the packet network to the SCN. MGs are not limited to SCN packet/frame/cell functions: a conference bridge with all packet interfaces could be an MG, as well as an (IVR) interactive voice recognition unit, an audio resource function, or a voice recognition system with a cell interface. A Media Gateway Controller (MGC) is defined as providing a control function for the MG.

Figure 3:
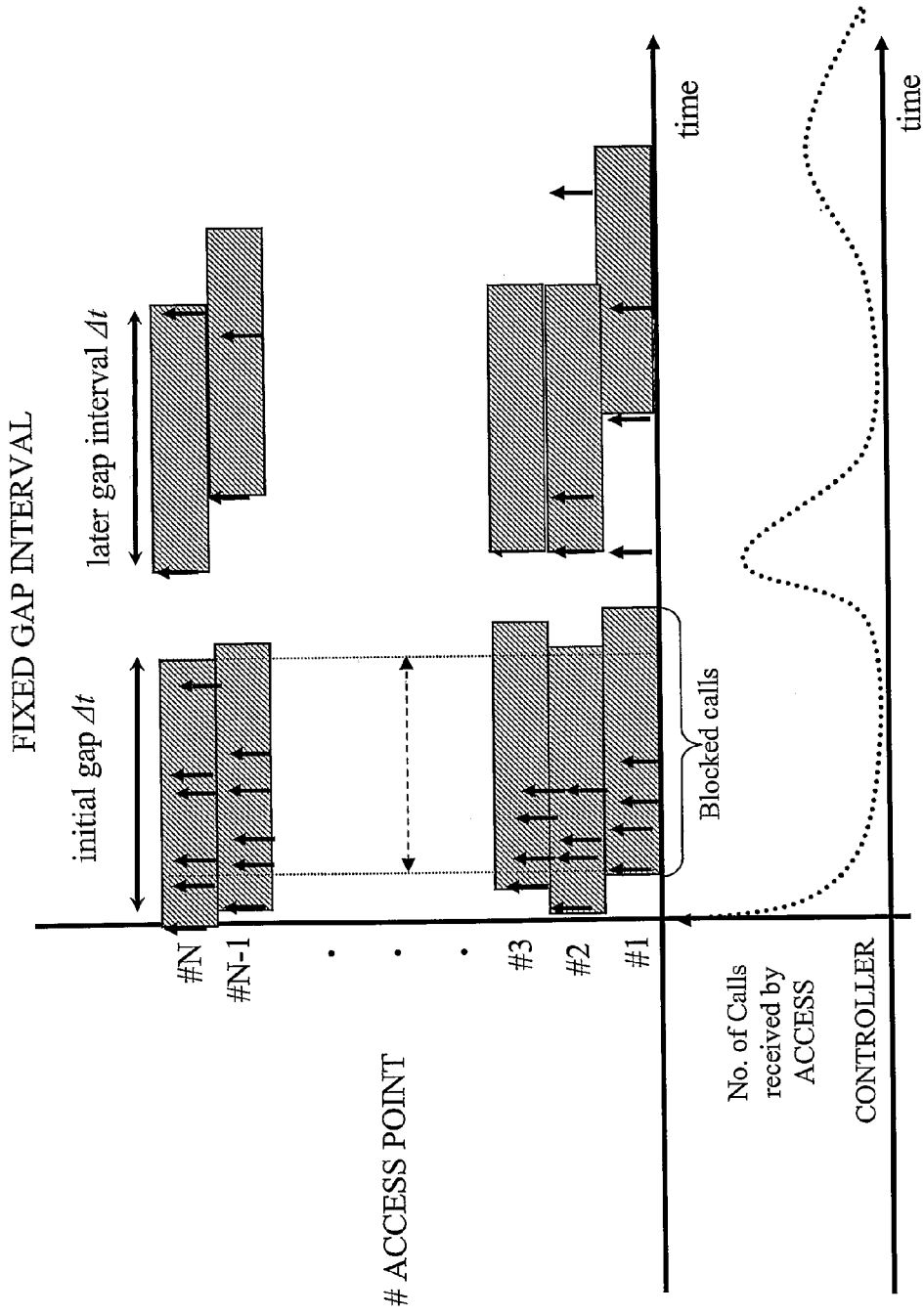
FIG. 3 shows a fixed gap interval overload control scheme.

In FIG. 3 of the accompanying drawings, a fixed gap interval call gapping technique is shown schematically, to demonstrate the effects a fixed gap interval applied at the network access points can have on the number of calls offered to the network access controller. If this type of gapping is applied to the access controllers shown in FIG. 1 to regulate traffic entering the communications network, the fixed gap interval call gapping process, for example, one implemented using a normal Crawford algorithm by each of the network access points, can result in repeated call surges being experienced by the access controller. These repeated surges occur in a synchronised manner and result from the Crawford algorithm, which in its basic form admits the first call from every MG and then admits no calls from any MG during the gap interval. Synchronisation detrimentally affects the operation of the overload control servo-system because the MGs are not able to deliver the rate requested by the MGC until sufficient time has elapsed for the synchronisation to be washed out by the randomness of call arrivals. This can be an unacceptably long time for stable control if the inter-call arrival time (for calls offered to the MGs) is much less than the gap interval. Synchronisation effects only occur in the overload response if the call rate is sufficiently high and the gap interval is sufficiently long. Synchronisation is dependent on the ratio of the inter-call arrival time for calls offered to the MGs to the gap interval each MG imposes on the arriving calls, and on the distribution of the numbers of lines at individual MGs. If all MGs have the same number of lines, then the synchronisation effect is more pronounced, however, if there is a broad continuous distribution in the numbers of lines attached to each MG, the synchronisation effects may be less severe, although the response of the arrival rate at the MGC to a change in the gap interval is still affected.

Referring to FIG. 3 in more detail, the upper part of the drawing shows schematically a number N of access points applying a regular gap interval by implementing a Crawford algorithm such as is well known to those skilled in the art. In the lower part of the drawing, a schematic plot of the number of calls received by a network access controller (for example, a MGC) as a function of time when a constant gap interval is imposed is shown.

As is well known to those skilled in the art, the Crawford algorithm enables each network access point to apply a gap interval on its calls which allows a first call to be admitted but then blocks all subsequent calls for a predetermined duration of time (the gap interval) g (such blocked calls are indicated in FIG. 3 by the arrows in the shaded areas—calls which are not blocked are indicated by arrows in non-shaded areas). After expiry of the first gap interval g, the next call requesting network access is admitted but then a subsequent call gap interval is applied.

As FIG. 3 shows, initially the high call rates results in the call gaps imposed by each of the access points superimposing to a high degree which results in the aggregate number of calls processed by the access controller falling to near zero. Each network access point (shown in FIG. 3 for example, as MG #1 . . . N) forwards an initial unblocked call to the network access controller (also referred to herein as the network access controller). Then, for given gap interval $g=\Delta t$, the network access controller (for example, a MGC), experiences a sharp reduction in the total number of calls received. However, on a timescale roughly equivalent to the duration of the gap interval g, the number of calls offered by all the access points to the network access controller rises again sharply. Only as time progresses do the maximum number of calls offered to the access controller decline and spread over a wider intervals as the gap intervals become less correlated and less overlap occurs. This is shown in FIG. 3 by the wider off-sets between the subsequent gap intervals. This "synchronisation" of the call pattern eventually disappears if the gap remains in place for an extended period of time.

Figure 4:
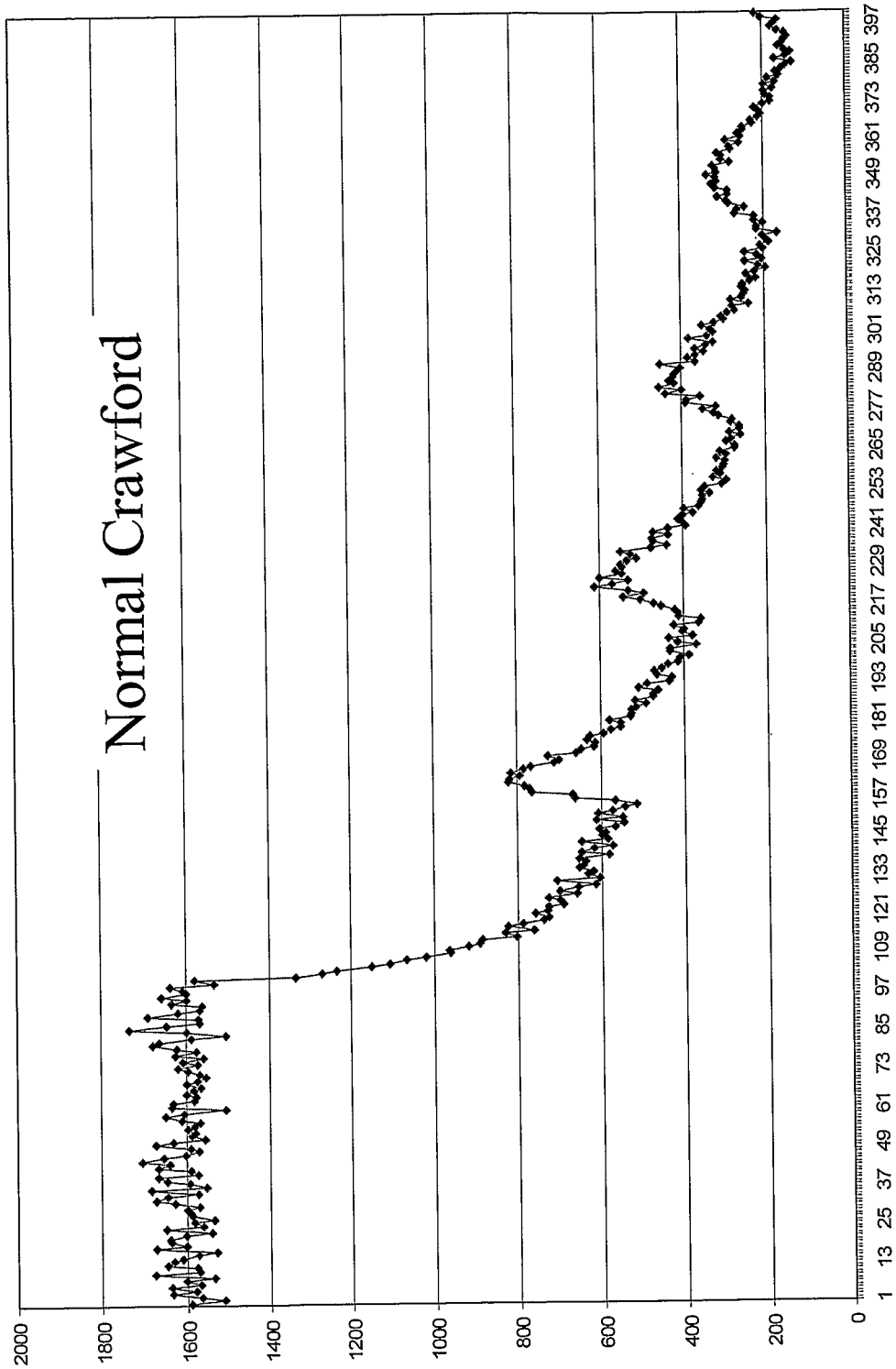
FIG. 4 shows the number of offered calls to an access controller as a function of time for a fixed gap interval scheme implementing a Crawford algorithm.

This behaviour is can be seen more clearly in the simulated example shown in FIG. 4, where a normal Crawford gapping algorithm has been used to impose a gapping process on a large number of access points comprising both 25-line MGs and single-line MGs. In FIG. 4, after each call a network access point receives, a local gap interval is determined according to the type of network access point. For example, where a MG receives calls over 25-lines, a 60 second gap is imposed during which other calls are blocked (and during which a caller may receive some signal indicative of the call being blocked, such as a line busy or a disconnection or other dial tone). However, each single line MG applies a gap interval of 25 times the gap interval imposed by the 25-line MG. Thus in this example a gap interval of 1500 seconds is applied by each single-line MG. In each type of MG, once the local gap interval has expired, the next call received by a network access point will be forwarded to the access controller and then a subsequent gap interval is imposed during with further calls are terminated.

In FIG. 4, the ordinary Crawford algorithm has been applied to a mixed population of 250,000 lines in the example shown which relates to 125,000 lines spread over 25-line access points and 125,000 lines on single line access points. The offered rate of calls from the access points to the access controller is 1600 calls per second (cps), and the access controller target rate is 160 cps. Such a ten-fold overload is considered to be typical of the type of focussed surge which communications networks can expect to experience as televoting-type mass calling services gain popularity.

The overall behaviour shown in FIG. 4 demonstrates a synchronised admission profile from the 25-line MGs superimposed on a falling trend as the single-line MGs progressively apply their first gap. The simulation does not show the synchronisation of traffic admitted by the single-line MGs as this occurs over a much longer time-scale than that shown in the plot of FIG. 4.

The admitted traffic rate shown in FIG. 4 changes over a time-constant roughly equivalent to the per-access point (i.e., gateway) call gap interval. However, this presents a problem, firstly as the repeated surges themselves may also overload the access controller, and secondly, as the access controller can make control update decisions at most only once every gap duration (i.e., every 60 seconds). This is too slow to adapt to an overload event which may require control updates of every 5 s or so.

To cope with highly variable and very high calling rates which are many times (for example, more than twenty times) the busy hour rate, the access controllers according to the invention implement a very rapid overload control. In particular, the overload control is imposed externally to the access controllers, by enabling each access point to function as an external controller implementing a local access constraint to limit the rate of traffic admitted to the network. The invention enables the access controller to determine an overload condition based on the number of calls which it receives from a plurality of access points (generally all of the access points within its domain but not necessarily always all). The access controller then determines a global constraint (for example, per line) to be imposed to reduce the rate of traffic which is admitted to the network. Each access point then modifies the global constraint to determine a local constraint (for example, per access point) which it uses to regulate the rate at which traffic is admitted to the network. In a preferred embodiment of the invention, the access controller no longer actively responds to off-hook indications received from calls which are to be blocked by the access points imposing a call gapping process. In another preferred embodiment, an access point does not need to send an off-hook to the access controller for calls which are not admitted by the local constraint applied at the access point.

Advantageously, the imposition of an initial, randomised local gap interval which is applied by an access point without a triggering call needing to be received by the access point, enables the access controllers to provide a more responsive overload control, and enables the access controller to provide updated global traffic rate constraints on a frequent basis. The modification of the global traffic rate by each access point is particularly advantageous within any network in which the access points have differing capacity (e.g., are arranged to receive traffic along a differing number of lines). For example, the population of access points within an IP network, in which each access point comprises a media gateway, can vary in composition considerably, from single-line MGs (of which there may be several thousand for example) to a single MG with a much higher capacity (for example, the ability to handle 16,000 lines). In such IP networks, it is not possible to apply a global constraint across the entire network as the gap interval imposed would not be suitable for all of the different types of MGs.

The invention thus provides an adaptive overload system for controlling the amount of traffic processed by a network access controller, where the network access controller is arranged to control a plurality of network access points, each network access point providing received traffic with access to the communications network.

Figure 5:
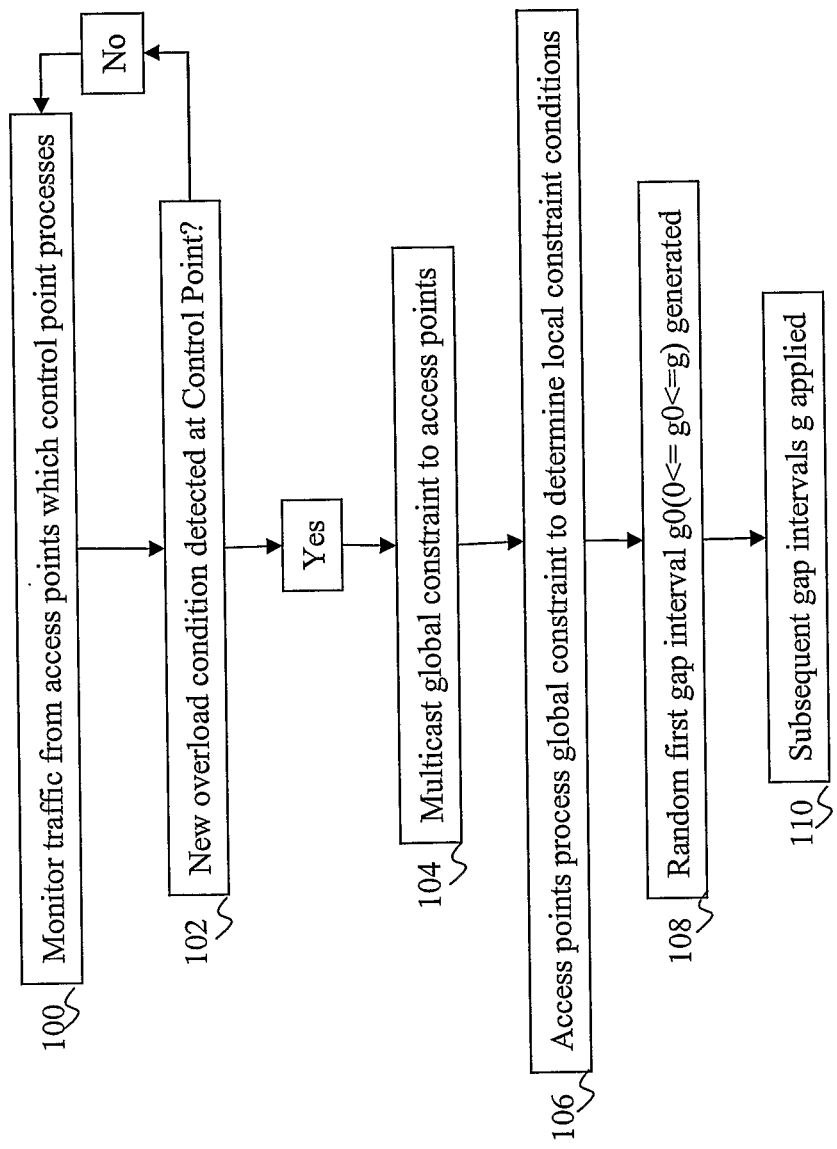
FIG. 5 shows steps in a overload control process according to the invention.

Steps to be performed to implement the overload control system are shown schematically in FIG. 5 of the accompanying drawings. In FIG. 5, the system comprises the controller determining whether an overload condition exists (step 102), for example by monitoring and analysing the traffic requests which it receives from all (or a subset of) the network access points within its, domain of control (step 100). By determining from the level of traffic offered to the access controller for processing whether an overload condition has/is likely to occur, a centralised overload system can be implemented by the access controller which provides a consistent and more rapid response to the overload condition across the network. This centralised overload response is provided by the network access controller multi-casting to each network access point which is functioning as a source of traffic offered to the access controller one or more control messages (step 104). At least one control message contains at least one globally determined traffic rate constraint condition. In some embodiments of the invention, more than one global constraint is determined by the network access controller, if, for example, a per-number constraint is imposed. In such an embodiment of the invention, a general, default, constraint condition can be imposed to prevent other traffic from overwhelming the network access controller with requests for processing, and one or more other global constraints can be imposed to prevent calls to a particular address from overwhelming the network access controller.

Each of the plurality of network access points within the domain of control of the network access controller receives said one or more multi-cast messages containing at least one global constraint. Depending on the type of multi-cast technique employed, this may be either all or a subset of the network access points within the domain of control. The received global constraint information is then processed by the receiving network access point (step 106) to determine one or more local constraint conditions. The set of at least one local constraint conditions to be imposed at the access point functioning as a source of traffic to the communications network is determined by modifying the global constraint condition in accordance with one or more characteristics of the network access point. The local constraint conditions include determining from the global constraint condition(s) at least i) the duration of the first gap interval to impose (step 108), and ii) the duration of subsequent gap intervals to impose, on subsequent traffic requests (i.e., on subsequent calls which seek access to the communications network) (step 110).

In an embodiment of the invention where the communications network supports IP (or VoIP), the global traffic rate constraint condition can be determined by a central destination MGC which functions as a controller for a set of MGs in the network. The MGC multicasts the control messages using layer-2 and layer-3 mechanisms, enabling the MGC controller to multicast only one global constraint message which is copied into the network infrastructure whenever a gap interval needs to be imposed or updated. The global constraint message is received by all traffic sources (MGs) subscribing to the multi-cast group with virtually no delay, enabling a fast response to the overload condition at the processing MGC to be implemented by all MGs which receive the global constraint message.

Each access point receiving a multicast global constraint message modifies the received global constraint information firstly by performing a modified Crawford algorithm to adjust the globally determined gap interval to an interval more suitable for the traffic rate and number of lines over which the access points receives traffic seeking access to the network. Secondly, the initial local gap interval is randomised in length to remove any synchronisation effects which could otherwise occur in mass calling scenarios with other network access points which could determine a similar local gap interval. More details on the randomisation of the gap interval will be described in more detail later herein below.

Figure 6:
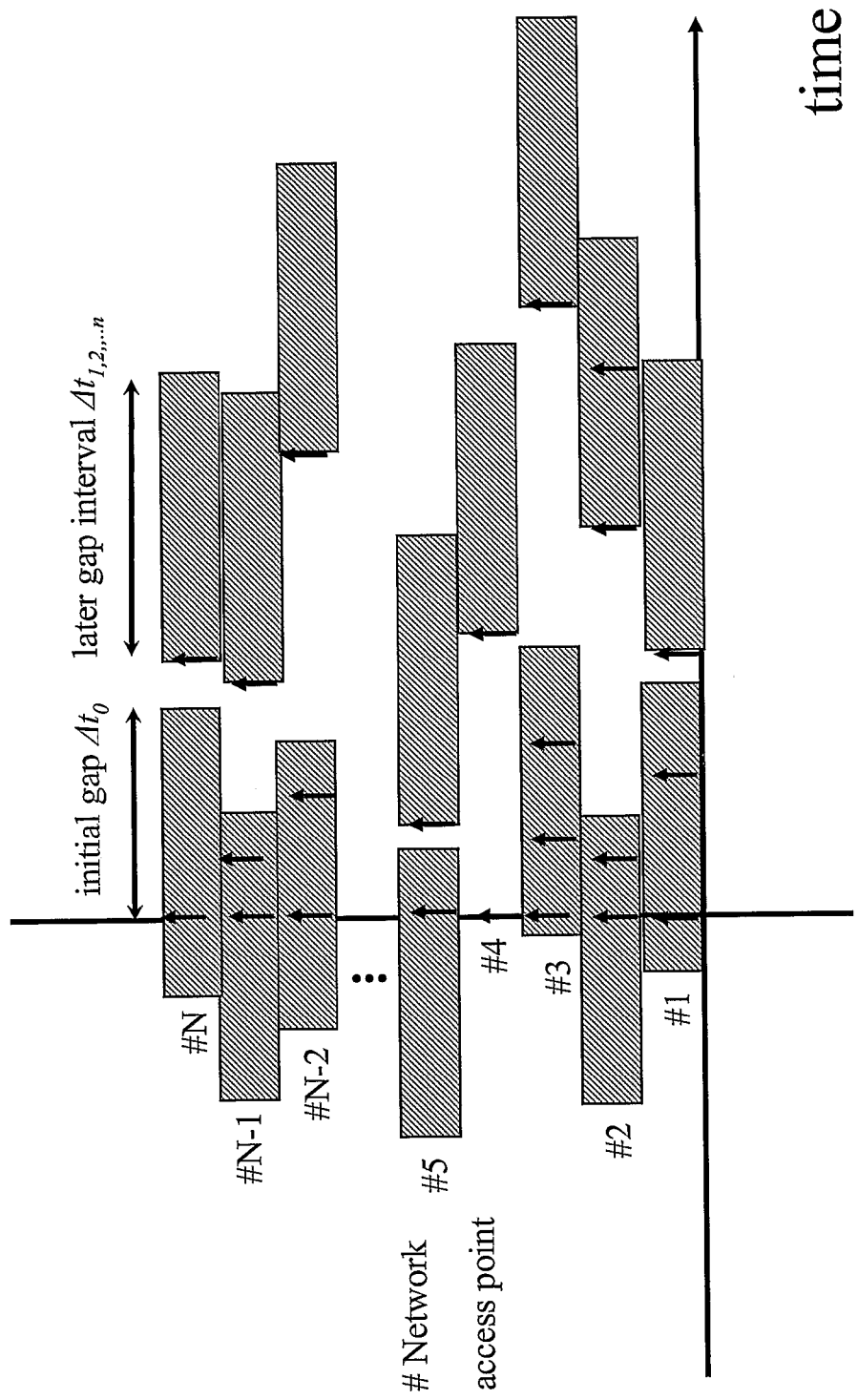
FIG. 6 shows an embodiment of the invention in which the initial gap interval is varied between differing network access points in a communications network.

Any suitable technique may be employed to determine the duration of the initial gap interval, and the access point will effectively behave as if a gap of the subsequent (fixed duration) time interval was imposed at some point in the past. This is shown schematically in FIG. 6 of the accompanying drawings. FIG. 6 shows a number of network access points (#1 to #N) all of the same type implementing an initial gap which varies in a random manner, followed by subsequent gaps which all have the same interval. The term gap interval is used here to mean the period of time following admission of a call, during which no further calls are admitted. Effectively, this simply delays the onset of the next full gap interval by a varying amount for all the access points subscribing to the multicast issued by the access controller. The duration of the first gap interval can be determined using any suitable technique e.g. using a random or pseudo random technique, so long as the result removes the synchronisation of call blocking experienced at the access controller (e.g., at the MGC).

To determine a global constraint condition, in one embodiment of the invention, the access controller provides each access point via the multi-cast message(s) with a per-line gap g interval and an estimate of the current rate per line r. In the steady state, there is a probability $1/(1+r*g)$ (for steady state and for traffic having a Poisson distribution) that the access point does not have an active gap interval. For access points which have an active gap interval, the initial gaps can be assumed to endure for a initial period of time which is equivalent to a gap of the standard interval duration having arrived at a previous point in time between 0 and the gap interval G being applied by that particular MG (see FIG. 6). Providing each access point uses random numbers to determine firstly if it should have an active gap interval, and if it does secondly to determine how much of the gap interval is left to run (which will be uniformly distributed in the range 0 to $G=g/L$ where L is the number of lines managed by the gateway), the synchronisation effects which would otherwise appear in the offered call rate at the access controller will no longer appear. This can be seen in FIGS. 7 an 8 of the accompanying drawings.

Figure 7:
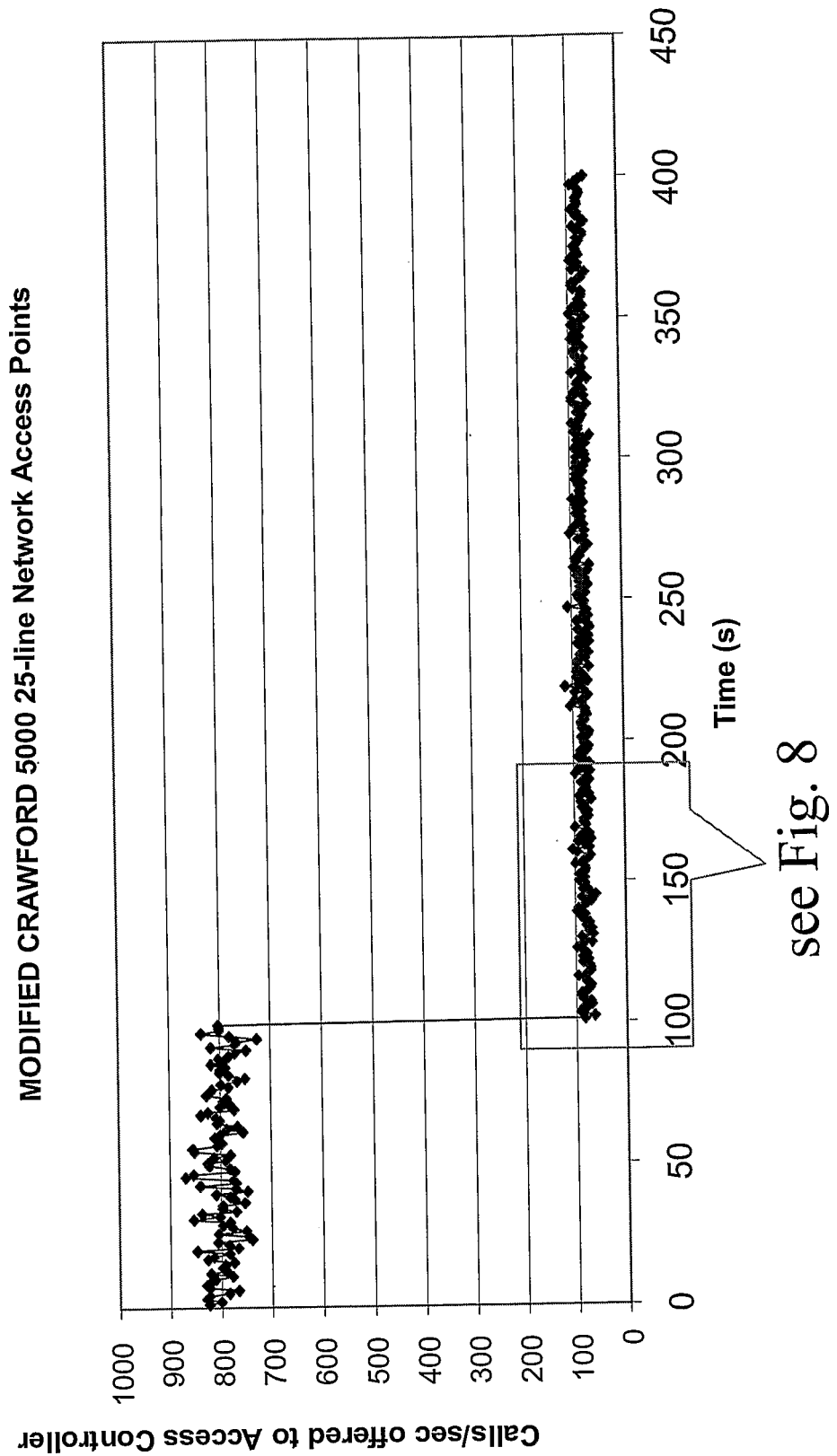
FIG. 7 shows the results of applying an embodiment of the invention on the number of offered calls to a network access controller.
Figure 8:
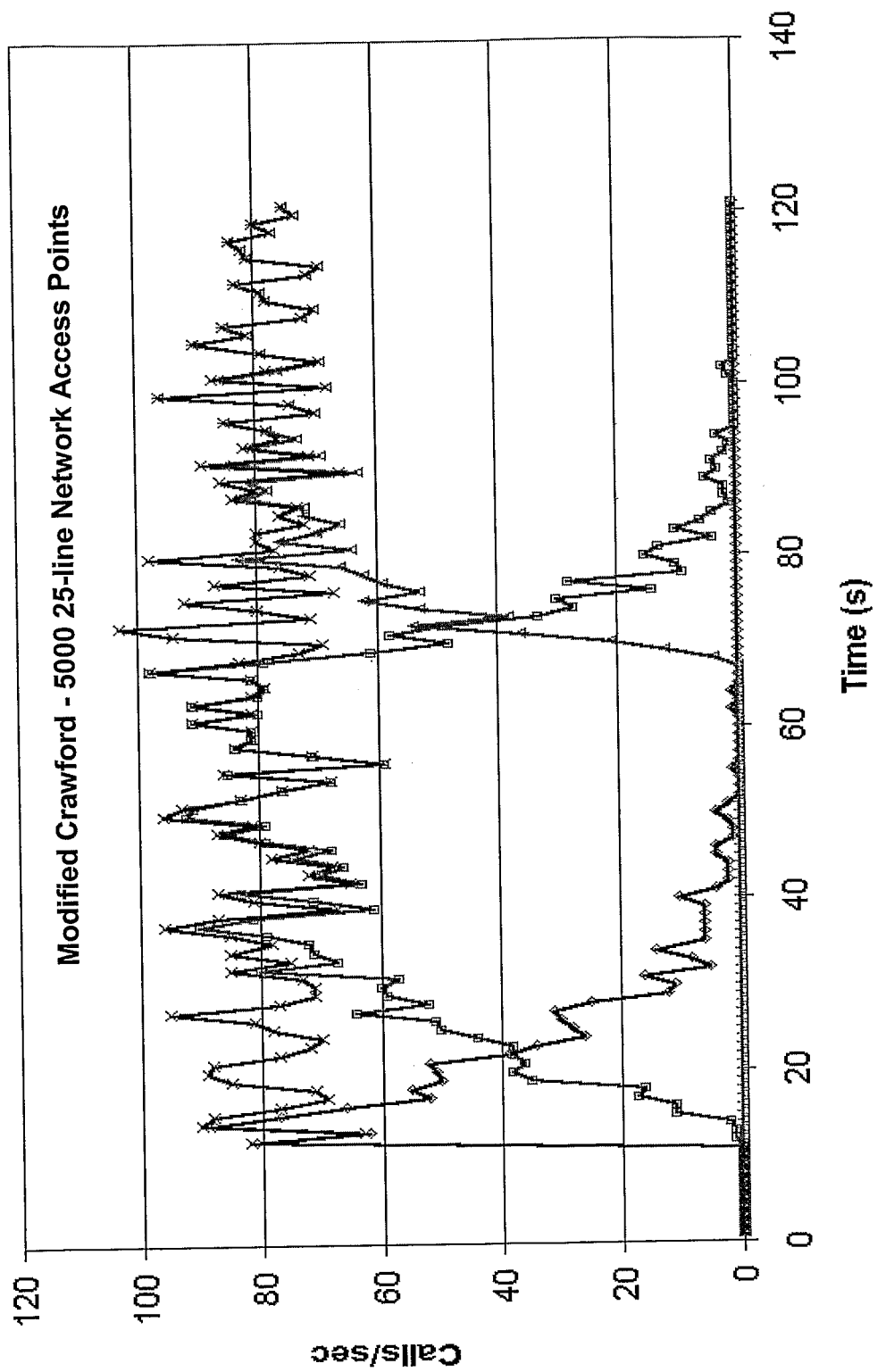
FIG. 8 shows an enlarged view of a portion of the plot shown in FIG. 7.

In FIGS. 7 and 8, a global constraint is provided by an access controller (for example a MGC) to five thousand network access points (for example MGs). Each access point is configured to receive traffic along twenty-five lines to be forwarded over a communications network (for example a VoIP network).

As shown by the embodiment of the invention in FIG. 8, consider if the number of calls offered by a plurality of MGs to a MGC is initially around 800 calls per second, whereas the MGC has a target rate of around 100 calls per second. Such call volumes are typical in televoting type scenarios. Accordingly, the MGC will multi-cast a global call-rate constraint containing a global gap interval parameter to several of the MGs within its domain of control to apply external overload control. The MGs then adapt the global constraint to their own capacities to determine a local gap interval. The MGs then each determine in a random or pseudo random manner an initial gap interval which may range from zero to the full local gap interval. Each MG then imposes the initial gap interval (if non-zero) without waiting for a call to be received, effectively this means the initial local gap interval is imposed as soon as the MG has determined its duration. This results in a drop in the number of calls offered by the MGs to the MGC which does not display the synchronisation effects known to occur in such scenarios when conventional call gapping techniques are employed. In FIG. 7, the MGC requests a restriction at t=100 seconds, i.e., at t=100 seconds the global constraint is generated and communicated to each of the MGs. The traffic admitted through each MG is then subject to the local constraint conditions, effectively almost immediately on receipt of the global constraint information from the MGC.

FIG. 8 shows in more detail the region indicated in FIG. 7. In FIG. 8, the relative proportions of the type of calls which are forwarded to the MGC by an MG following the MG implementing a local gap condition are shown schematically. Briefly, the calls subsequently forwarded to the MG can be either i) a call forwarded without being subjected to a local gap condition as an initial gap interval of zero had been previously applied; ii) a call forwarded after an initially shortened local gap interval has been applied; or iii) a call forwarded after a normal regular length local gap interval had been applied by the MG. This later group of calls (iii) obviously forms a substantial proportion of the calls much later than calls in groups (i) or (ii).

In FIG. 8, the sum of all calls forwarded admitted on a MG is shown indicated by the line with X's marking each plotted point. Initially, the number of calls admitted by MGs which effectively did not impose an initial gap interval (i.e., for which the initial gap interval was zero) dominates the received calls. This is shown by the line with ◇ marking each plotted point. As time progresses, however, the line with □ making each point shows the number of calls admitted after the expiry of the initial (shortened) local gap interval begins to dominate. Eventually, as the line with Δ marking each plotted point shows, the number of calls admitted after the expiry of a normal (regular) local gap dominates the population of calls forwarded to the MGC by an MG.

Figure 9:
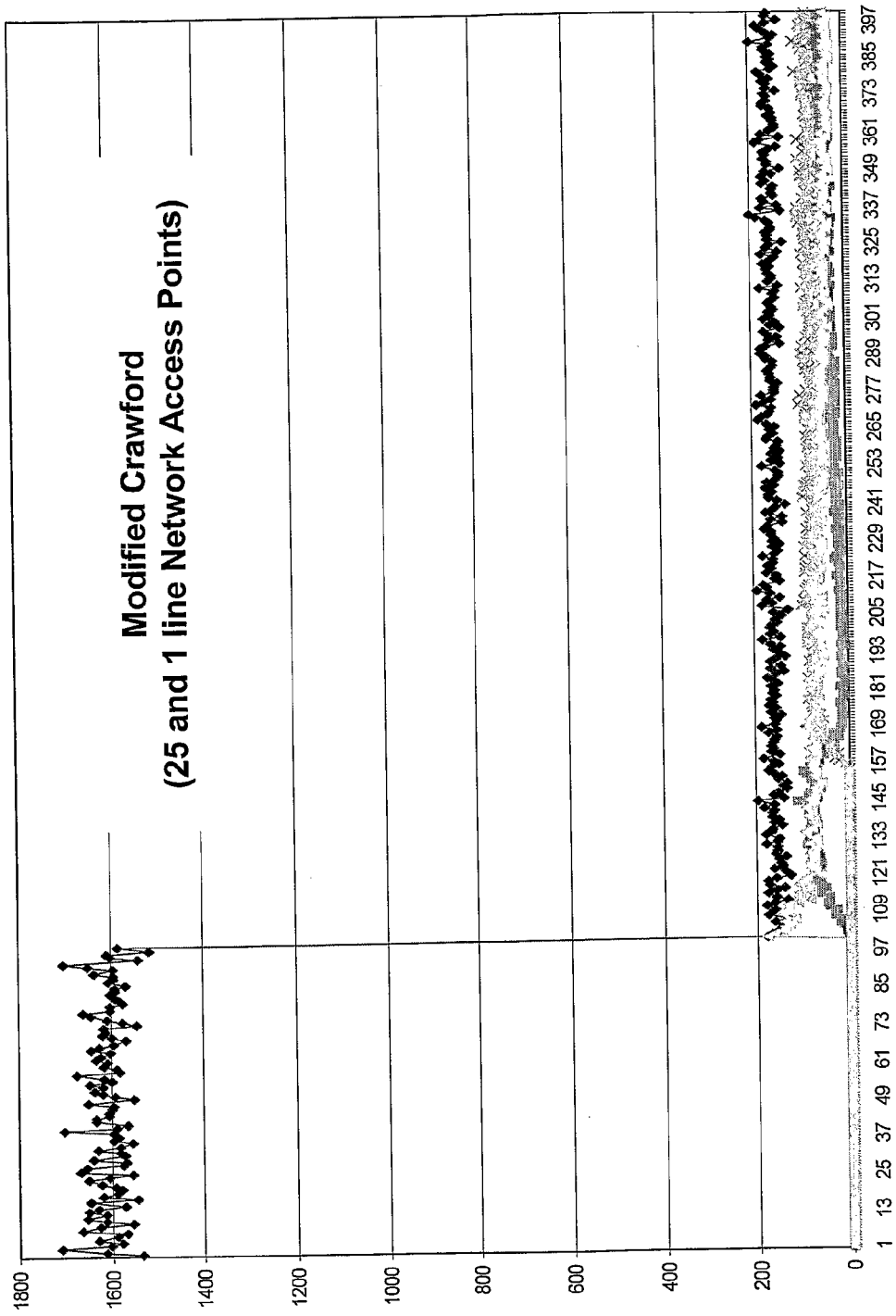
FIG. 9 shows the results of applying another embodiment of the invention on the number of offered calls to a network access controller.
Figure 10:
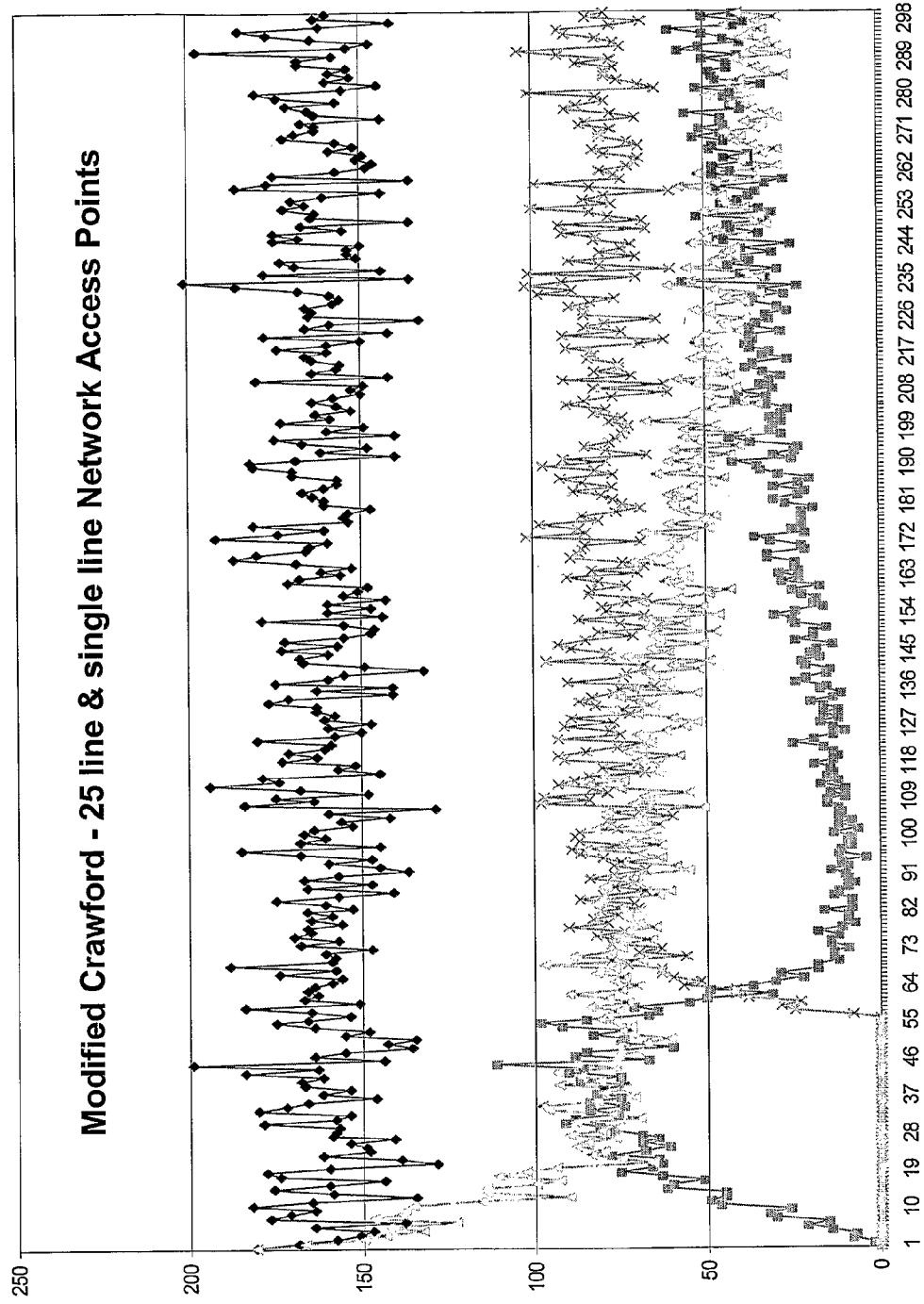
FIG. 10 shows an enlarged view of a portion of the plot shown in FIG. 9.

FIGS. 9 and 10 shows another embodiment of the invention, demonstrating the effect of the global constraint imposed by an MGC when two differing populations of MGs are contained within its domain of control. In FIGS. 9 and 10 more complex behaviour is exhibited. Here 125,000 lines are connected to 25-line gateways, and 125,000 lines are connected to single-line gateways. The single-line gateways scale the proportion of calls by a factor of 25 compared to the results obtained for 25-line MGs (such as FIGS. 7 and 8 show).

As FIG. 7 to 10 clearly indicate, however, the synchronisation effect which would otherwise enable repeat processing demand surges to be experienced by the access controllers (e.g., the MGCs) is removed by the introduction of the initial gaps which have a gap interval which varies in a random manner between the access points. Apart from their duration being different, the initial gaps otherwise perform a conventional gap function. All calls arriving before the expiry of the interval timer are rejected, but if a call arrives after expiry of the interval time, the call is admitted and a new gap timer commences.

When a gap interval update arrives after the start of the local overload control being implemented by a network access point, a mechanism to enable the control to be imposed almost immediately can be provided by ensuring that if a second control message is received, the constraint process described above is automatically reiterated. One possible scheme to implement an update is for the access controller to determine on a periodic basis that the overload condition is still exceeded, and for the access controller to determine from the aggregated traffic rate which it is then receiving from all network access points providing traffic to the access controller that an update in one or more global constraint (i.e., a new scalable global gap interval) is necessary. If the new global gap information which is sent down to each access point contributing to the aggregate rate the access controller has measured results in the access point determining a local gap interval which is less than the currently imposed gap interval, any currently running interval timer may be updated to reflect this change and the currently running interval reduced accordingly (or set to zero). If the new global gap interval results in the local gap interval being updated to a longer period, then the local interval timer may be extended, lengthening any gap already imposed. Alternatively, in either case, the currently running interval could be stopped and a new initial local gap interval determined whose duration is between zero and the new gap interval duration, which effectively reiterates the overload control process.

Another advantage of the invention is that the access control implemented enables the network access points (e.g., the MGs) to prioritise certain calls, for example, those to emergency services (such as 999, 911 etc), as well as enabling appropriate termination of blocked calls (for example to ensure that all relevant state machines reflect any changes back to an on-hook condition). The invention also enables the called address to be determined prior to the restriction being imposed, by selecting the positioning of the global constraint message in the message flow between the MGC and the MG appropriately.

Figure 11:
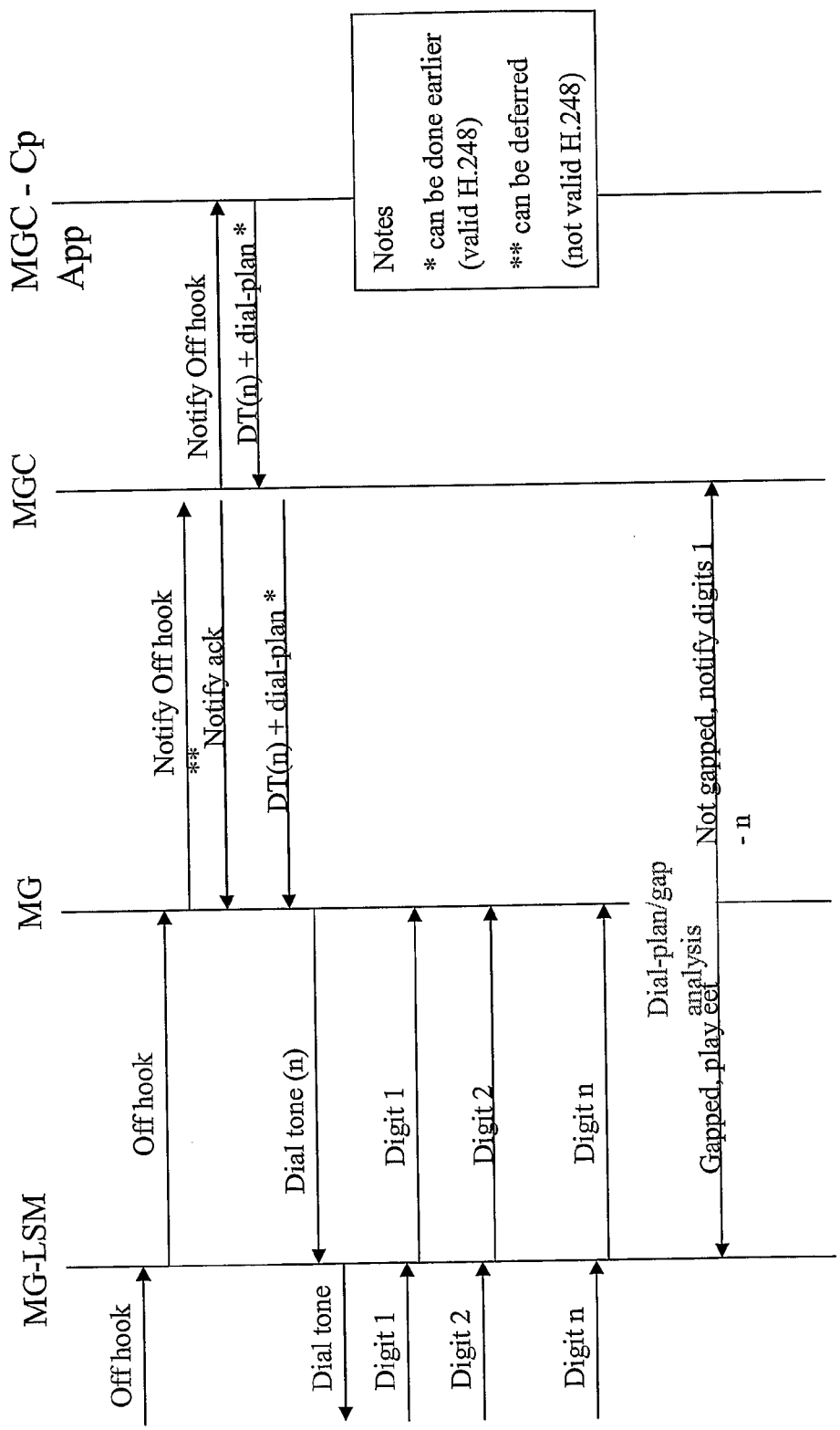
FIG. 11 shows the message flow between a media gateway and a media gateway controller in an embodiment of the invention.

For example, turning now to FIG. 11 of the accompanying drawings, an example of a message flow between the MGC and the MG according to an embodiment of the invention is shown. Whilst in the following embodiment explicit reference is made to a standard which is relevant in the context of media gateways (MGs) and to media gateway controllers (MGCs), those skilled in the art will appreciate that alternative standards may support similar message flows between other types of network access points and network access controllers.

Referring now to FIG. 11, initially, as a call commences the MG line-state-machine (LSM) is put in an off-hook condition, the off-hook is then notified to the MGC, which acknowledges the message to the MG. If the H.248 protocol is supported, then the off-hook condition should be immediately notified by MGC to the MGC call processing application (CpApp), however, it is not essential to notify the off-hook condition, and if strict compliance with H.248 is not required, this can be deferred or not implemented at all. If the MGC CpApp has been notified, it will return a message to the MG via the MGC indicating the type of dial-tone in use, together with details of any dial-plan which is being supported. An alternative use of H.248 enables the MGC to send the dial-tone and dial plan (for application to a specific physical termination, i.e., copper pair) to the MG in advance of a call (e.g., when the required dial tone changes). This removes the need for the MGC to send anything back in response to the off-hook, and enables the possibility of not sending the off-hook.

As the call progresses, the MG LSM will forward the called digits it receives to the MG which will then implement the dial-plan and perform the necessary gap analysis in accordance with the control constraints imposed by the MGC/MGC CpAppl. If the gap is being imposed, then the MG may wish to communication this, for example, by generating an Equipment Engaged Tone to the call originator. If no gap is being imposed, then the digits 1-n can be communicated to the MGC.

In an alternative embodiment of the invention, the MG does not receive an acknowledgement to the off-hook message to reduce the per call processing burden of the MGC. Instead, the MGC simply provides the MG with details of the dial tone type (i.e., DT(n)) and details of whether a dial-plan is to be implemented.

The dial-plan means that after a certain number of digits have been sent to the MG, the MG analyses the numbers dialled to determine if the call conforms with the criteria imposed by the dial-plan for implementing the gap constraint. A default constraint may be imposed for certain numbers which are not otherwise supported by the dial-plan. If the call is determined to be exempted from the gap constraint, it is sent to the MGC, however, if not, the call is only sent to the MGC if allowed, i.e., if a gap interval already imposed has expired or if the initial gap interval is zero, so that no gap is to be imposed until after the next call is received. This is shown schematically in FIG. 12 of the accompanying drawings which show the point at which the access controller notified for three differing types of call.

Figure 12:
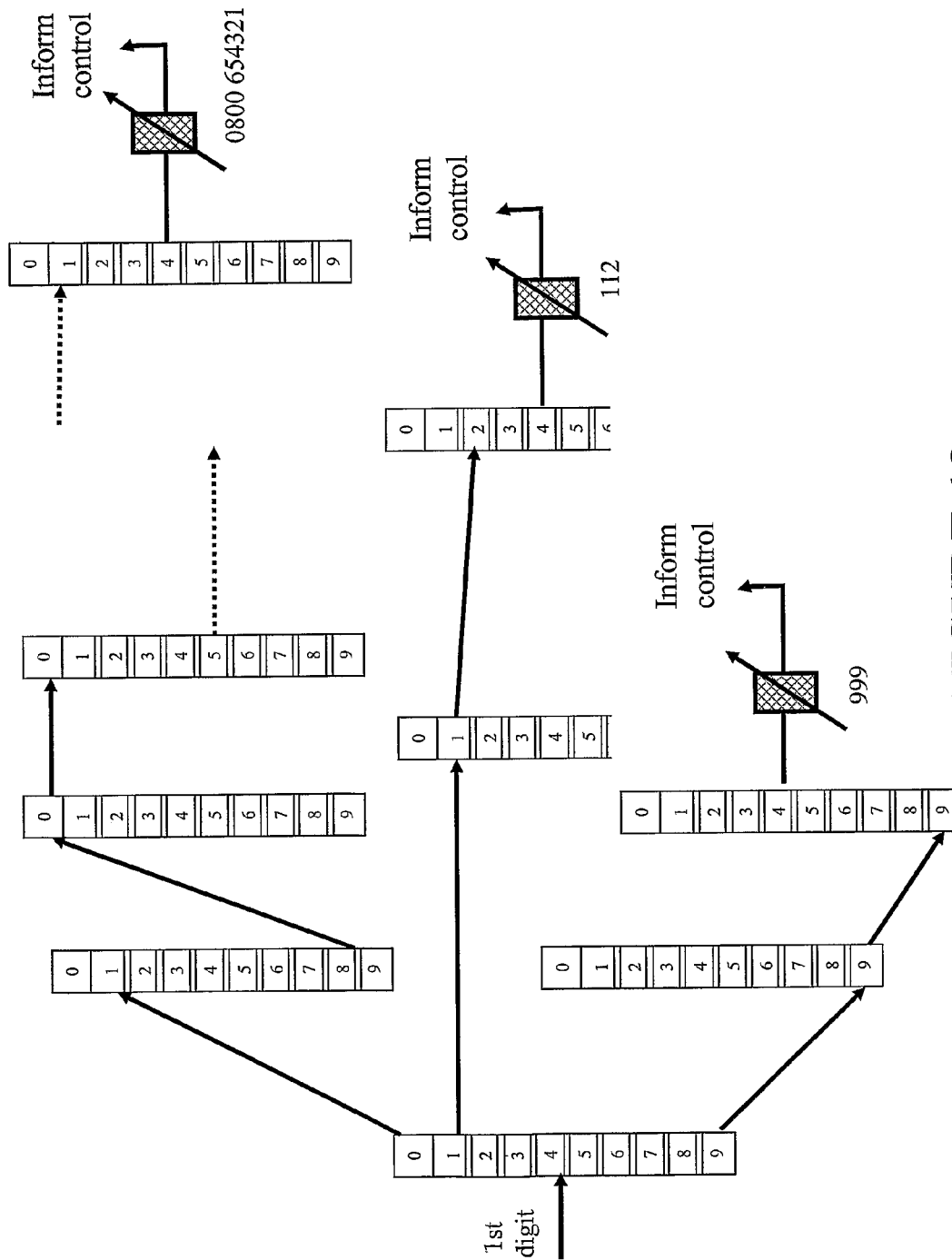
FIG. 12 shows schematically how the overload control can be implemented on a per-number basis in an embodiment of the invention.

In FIG. 12, the first call relates to a caller dialling 0800654321. This number is not recognised after the first three digits as relating to a priority call (which would trigger earlier notification to the MGC). However, the other two numbers shown in FIG. 1 relate to priority numbers (112, and 999) which trigger early notification to the MGC. If another number, such as the number 012345 67890 were to be dialled, which was not supported by the dial-plan, then a default (or wildcard) constraint could be applied by the MG.

One method of determining the global gapping interval at the access controller is for a controller to determine the rate at which it is rejecting the off-hooks provided by the signal sources. The controller is able to multi-cast a single per-user global gap which each traffic source then scales from the global gap size to a local gap size in proportion to its capacity, and then randomly imposes an initial gap duration from zero to the local gap size. Each traffic source then applies the local gap to all non priority calls, and the gapping impacts only the service offered to ordinary calls.

However, in another embodiment of the invention, the controller performs a similar adaptive internal control and measures the rate at which it rejects off-hook messages received from traffic sources, however, the controller performs analysis of the rejection rate in accordance with the called identities, to determine which called identities need gapping. In this context, a call identity may comprise a network address etc.

The controller then determines a global constraint and a per-number global constraint and multi-casts these global constraints to each traffic source. A traffic source then scales the global constraints to determine from the global gap information provided by the controller what local gap interval size should be employed according to the capacity of the traffic source. A random initial gap interval size is also determined. As calls are made, the numbers dialled are analysed by the network traffic source to determine the most appropriate gap interval to use for the specific dialled number scheme. Thus in FIG. 12, if certain digits are recognised as relating to a priority number, then no gap is imposed (e.g., the 112 and 999 numbers), whereas the 0800 6543231 number would be subject to normal barring. However, in other embodiments of the invention, the dial plan could indicate that only televote/mass dialling numbers are to be subjected to gapping, which would enable ordinary calls made to non-priority numbers to also be made without the access controller experiencing an overload of traffic processing.

In this way, a VoIP network which has a busy hour capacity of 16,666 cps can effectively cope when over 100,000 cps are forwarded from digital line exchanges, for example in a mass-dialling situation, without non-mass-dialling related traffic from being impacted. In such an embodiment of the invention, the control requirements of the MG-MGC are simply to maximise the effective call throughput at the overloaded MGC subject to the MG response times (which are usually less than 200 ms), and to enable both priority calls and optionally to protect ordinary (non-priority calls) from experiencing the surges induced by televoting type-calls.

Figure 13:
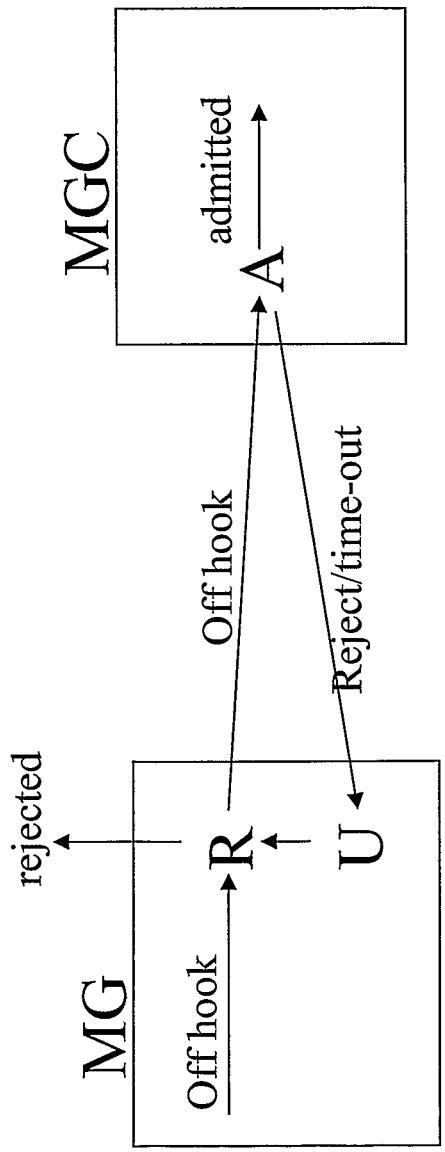
FIG. 13 shows a locally determined constraint update process.
Figure 14:
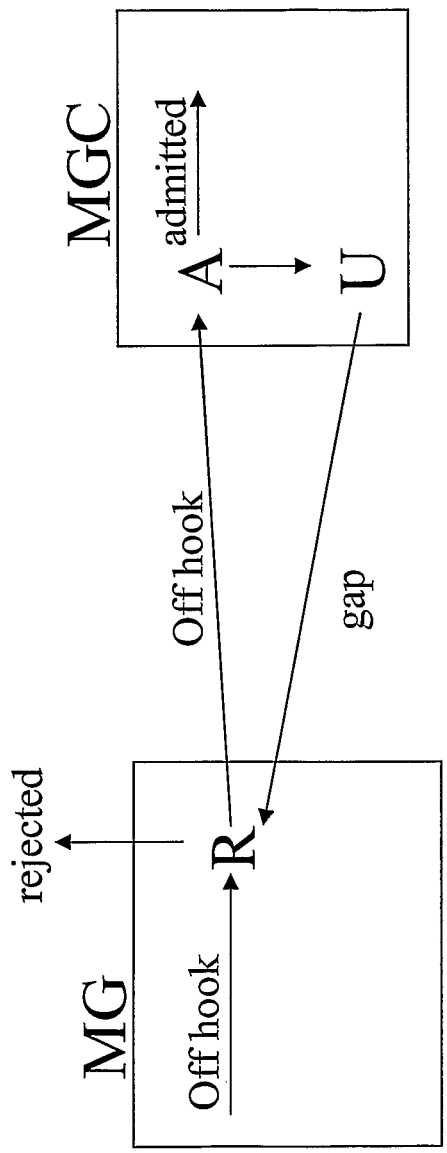
FIG. 14 shows a globally determined constraint update process.

FIGS. 13 and 14 contrast the overall architecture of the overload control in terms of the location of functions. In FIGS. 13 and 14, A is the MGC's admission function, R is the MGs local overload constraint restriction, and U is the update function.

FIG. 13 shows MG-MGC scenario in a VoIP network in which restriction updates are to be implemented. In FIGS. 13 and 14, an off-hook signal is transmitted by the MG to the MGC, the MGC applies admission control, and the MG applies an appropriate constraint to limit overloading of the MGC. However, in FIG. 13, the MG updates the overload locally without any control by the MGC. This update may be based on one or more criteria. For example, the update may be based on explicit rejection of new call attempts by the MG to the MGC, or on a long delay seen by an MG between its sending a message to the MGC and the MGC's acknowledgement of a response which would indicate a very heavy load at the MGC. Those skilled in the art will appreciate that the architecture of FIG. 13 is inappropriate for single-line MGs or those with only a few lines, which necessarily send a lower rate of calls to the MGC than larger MGs, because the MG uses only the MGC's responses to call events to determine whether MGC is overloaded and to adapt its local constraint. If only a low rate of call events is sent, the MG has limited information on which to base its estimate of the existence and severity of overload at MGC, and constraint adaptation is necessarily slow. However, for large gateways, this embodiment of the invention has the advantage of not requiring any modification to the H.248 standard recommendation.

FIG. 14, in contrast, shows schematically the MGC determining the updated conditions. This enables a more responsive overload control to be implemented. In FIG. 14, when the MG receives an off-hook condition, the MG forwards this to the MGC and the MG updates its global constraint condition. The MGC then determines if a new or updated global constraint is to be generated and communicates the new global constraint condition (i.e. new global gap interval) back to a selection (or all MGs) using an appropriate communications technique (multi-cast) to provide one or more control messages which all MGs receive. Each MG then processes the call using a modified local constraint which it determines from the updated global constraint information provided by the MGC to determine if the call is to be rejected or not.

The MGC has access to the aggregated traffic flows that it receives from each MG, and thus receives a higher traffic rate than each MG does individually, which enables an accurate estimate of the traffic rates (overall and to specific dialled numbers) to be obtained. As the traffic rate received by the MGC is higher than that at an individual MG, more frequent updates to the external overall control conditions to be implemented by each MG (which receiving an updated global constraint from the MGC) are possible than if the MG were to determine local traffic rates and generate a local constraint independently of the MGC (such as FIG. 13 showed).

This second control option has the advantage that the aggregation of overload can be avoided as there is an instantaneously effective gap with a randomised initial interval (which is multi-cast by the MGC). However, the H.248 standard recommendation may require modification in view of the global gap constraint being returned by means of a multi-cast message from the MGC, and the invention can be implemented by other suitable techniques which communicate the global gap interval information to each MG which is contributing to the aggregate traffic rate determined by the MGC. It is up to each MG to modify the global constraints it receives to suit its own characteristics, and to implement local gap logic and appropriate dial-tones (although these may be determined centrally by the MGC).

Figure 2:
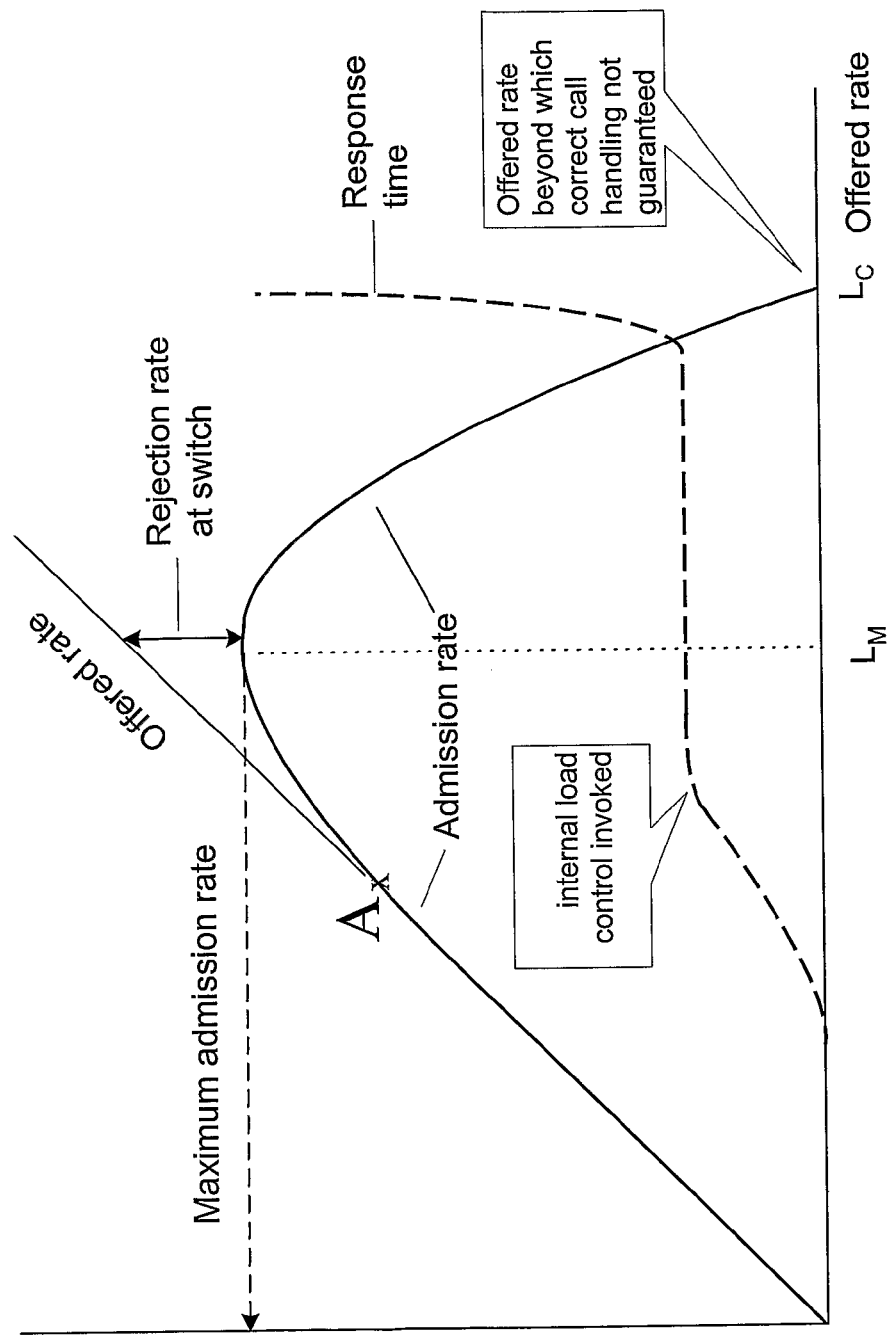
FIG. 2 shows the result of overloading an access controller in a communications network.

In a mass calling scenario, each network access point will receive a large number of calls within a short period of time which all have the same target address (e.g., the same number can be dialled by a large number of calls within a very short, almost simultaneous, time period). Control over all of the access points can be implemented by the invention relatively rapidly to prevent the response time from rising to unacceptable levels such as was shown in FIG. 2.

Those skilled in the art will therefore appreciate that the access controller is determining an aggregate traffic rate for the traffic which is it offered from each contributing network access point. This aggregate rate is higher than the rate at an individual access point, which means that even when the external overload control has been already implemented, the access controller will be able to more reliably determine from the actual offered traffic rate whether the external overload control requires updating. The imposition by each network access point which receives a control message from the access controller of a local constraint (i.e. a local gap interval) which is derived from the information the access controller has generated (which may comprise, for example, the aggregate traffic rate and per-line traffic rate information) can then be implemented more rapidly than if the update conditions were simply determined by the network access point itself. By imposing an initial gap duration immediately which each access point determines autonomously (i.e., independently of the initial gap duration imposed by each of the other access points), there is no need for the access points to communicate with each other.

Although the means by which control messages are communicated by the network access controller to each network access point is preferably performed by a multicasting technique limited to those access points contributing to the aggregate offered traffic rate at the network controller, other suitable communications means known to those skilled in the art may be employed.

Where a multicasting means of communication is employed by the access controller, the network will need to support the communication multicasting process (or an equivalent selective broad-casting type of process) which enables the access controller to multicast the global traffic access rate constraint(s) over the communications network to the network access points. Multicasting is preferable as this enables more rapid control to be imposed on the MGs in an IP network, and enables the MGC to be more responsive and to update the call constraints over shorter timescales than that known in the art. The adaptation of the multicast call constraint determined globally by the access controller to suit the individual MGs enables more effective call restriction by each MG within the domain of control of a MGC.

Those skilled in the art will further appreciate that a unicast transmission of constraint messages to each network access point may be used in place of multicast if the underlying transmission network has sufficient bandwidth to ensure constraints are in place at the majority of access points sufficiently quickly for effective control of the overload. This removes any reliance on slow unicast distribution to randomise start times of gap intervals, as traffic restriction will be either sluggish (if constraint distribution is slow) or synchronised (if constraint distribution is fast). Adequate control relies on fast distribution of constraints and explicit randomisation of gap start times.

The text of the abstract repeated below is hereby deemed incorporated into the description:

An adaptive overload system for controlling the amount of traffic processed by a network access controller is described for a network access controller arranged to control a plurality of network access points. Each network access point provides traffic with access to the communications network and the system comprises determining at the network access controller if an overload condition exists, and if so, generating at least one global constraint to restrict the rate at which a network access point admits said traffic to the communications network. The controller then multicasts at least one global traffic constraint to one or more of said plurality of network access points. Each network access point receiving the global constraint then processes the global traffic constraint to determine a plurality of local constraint conditions. The receiving network access point performs the following steps to determine said local constraint conditions: determining a local predetermined gap interval to be imposed on said traffic; and determining an initial gap interval which differs from the subsequent local predetermined gap intervals, the initial gap intervals differing between each of said plurality of network access points. The initial gap intervals are determined in either a random or pseudo-random manner to ensure synchronisation effects at the network access controller which would otherwise occur in high call rate scenarios are removed.

Although the above embodiments have been described with reference to modifying a Crawford algorithm to determine the local gap interval, those skilled in the art will appreciate that other restriction algorithms which can be applied by the network access points to restrict the traffic rate offered to the controller may be suitably modified to implement alternative restrictions in other embodiments of the invention.

What is claimed is:

1. An adaptive overload control method for controlling the amount of traffic offered by a plurality of network access points to a network access controller for processing, the plurality of network access points being arranged under control of said network access controller to provide said traffic with access to a communications network, the method enabling said network access controller to externally control the amount of traffic which it processes by regulating the rate of offered traffic, the method comprising:
   (a) at the network access controller using at least one programmed processor to: determine if an overload condition exists, and if so,
      (i) generate at least one global constraint to restrict the rate at which a network access point admits said traffic to the communications network, the global constraint including a global gap interval; and
      (ii) communicate said at least one global traffic constraint to one or more of said plurality of network access points; and
   (b) at each respective network access point receiving said at least one global traffic constraint, using at least one programmed processor to:
      (i) process the received global traffic constraint to determine a plurality of local gap interval constraint conditions for the respective network access point by:
         determining a local gap interval ($\Delta t$) to be imposed on traffic received by said respective network access point, the local gap interval being determined by scaling the global gap interval in dependence on the capacity of said respective network access point; and
         determining an initial local gap interval ($\Delta t0$) which differs from the determined local gap interval ($\Delta t$), wherein each initial local gap interval ($\Delta t0$) is determined independently by each respective ones of said plurality of network access points to be between zero and the local gap interval ($\Delta t$) for said respective network access point; and
      (ii) impose said local initial gap interval ($\Delta t0$) at each of said plurality of network access points directly responsive to receipt of a global gap condition and before further traffic is received at the respective network access point for admittance to said communications network.

2. A method as claimed in claim 1, wherein said traffic comprises communications call-related traffic.

3. A method as claimed in claim 1, wherein the network access controller analyses the rate at which traffic is offered to the network access controller to determine said at least one global traffic constraint.

4. A method as claimed in claim 1, wherein the network access controller determines if an overload condition exists at the network access controller from the aggregate rate at which traffic is offered by all of said plurality of network access points to said network access controller, and wherein said at least one global constraint is derived from said aggregate offered traffic rate.

5. A method as claimed in claim 1, wherein the network access controller analyses the rate at which traffic is rejected by the controller to determine said at least one global traffic constraint.

6. A method as claimed in claim 5, wherein the network access controller determines if an overload condition exists at the network access controller from a reject rate comprising a rate at which the traffic offered by all of said plurality of network access points to said network access controller is rejected, and wherein said at least one global constraint is derived from the reject rate.

7. A method as claimed in claim 2, wherein said network access controller determines said at least one global traffic constraint by analyzing the rate at which off-hook signalling messages are rejected by the network access controller.

8. A method as claimed in claim 1, wherein the aggregate distribution of intervals imposed by all of said network access points under the control of the network access controller is randomized at the onset of the local gap interval ($\Delta t$) constraint imposed by each said network access point.

9. A method as claimed in claim 8, wherein said randomization is imposed individually by each network access point generating an initial local gap interval ($\Delta t0$) whose duration is determined by a random process.

10. A method as claimed in claim 8, wherein said randomization is imposed individually by each network access point implementing said local gap interval ($\Delta t$) constraint immediately following processing of the global constraint information received, and wherein the time for the global constraint information processing to be completed following the network access controller generating said global constraint information varies for each of said plurality of network access points.

11. A method as claimed in claim 1, wherein in said step of communicating said at least one global traffic constraint to one or more of said plurality of network access points, at least one global traffic constraint is multicast to one or more of said plurality of network access points.

12. A method as claimed in claim 1, wherein the initial local gap interval ($\Delta t0$) is determined at each network access point using a random or pseudo-random technique.

13. A method as claimed in claim 7, wherein said communications network is a VoIP network, and said traffic comprises call-related traffic.

14. A method as claimed in claim 7, wherein said network access controller is a Media Gateway Controller and each of said plurality of network access points comprises a Media Gateway.

15. A method as claimed in claim 1, wherein a global traffic rate constraint is determined by said network access controller for an address.

16. A method as claimed in claim 1, wherein the number of lines along which a network access point receives traffic for transmission across the communications network and a scalable gap interval determined by the network access controller based on the aggregate traffic offered to the network access controller by all contributing network access points are used to determine said local gap interval ($\Delta t$).

17. A method as claimed in claim 1, wherein a dial-plan is implemented by a network access point to make it unnecessary to send an off-hook condition message to the network access controller when a local gap interval ($\Delta t$) constraint is being imposed.

18. A method as claimed in claim 1, wherein each network access point determines the initial gap interval ($\Delta t0$) using a probabilistic method.

19. A method as claimed in claim 1, wherein the initial gap interval ($\Delta t0$), if not zero, is determined by each network access point such that all of the network access points' initial gap intervals ($\Delta t0$) are uniformly distributed in the range from zero to the local gap interval ($\Delta t$) determined by each network access point.

20. An adaptive overload control system for controlling the amount of traffic offered by a plurality of network access points to a network access controller for processing, the plurality of network access points being arranged under control of said network access controller to provide said traffic with access to a communications network, the system enabling said network access controller to externally control the amount of traffic which it processes by regulating the rate of offered traffic, the system comprising:
(a) at the network access controller:
  (i) means for determining if an overload condition exists;
  (ii) means responsive to the determination that an overload condition exists for generating at least one global constraint to restrict the rate at which a network access point admits said traffic to the communications network, the global constraint including a global gap interval; and
  (iii) means for communicating said at least one global traffic constraint to one or more of said plurality of network access points, and
(b) at each respective network access point:
  (i) means for receiving said at least one global traffic constraint;
  (ii) means for processing the received global traffic constraint to determine a plurality of local gap interval constraint conditions for the respective network access point by:
    determining a local gap interval ($\Delta t$) to be imposed on traffic received by said respective network access point, the local gap interval being determined by scaling the global gap interval in dependence on the capacity of said respective network access point; and
    determining an initial local gap interval ($\Delta t0$) which differs from the determined local gap interval ($\Delta t$), wherein each initial local gap interval ($\Delta t0$) is determined independently by each respective ones of said plurality of network access points to be between zero and the local gap interval ($\Delta t$) for said respective network access point; and
  (iii) means for imposing said local initial gap interval ($\Delta t0$) at said respective network access points directly responsive to receipt of a global gap condition and before further traffic is received at the respective network access point for admittance to said communications network.

21. The method as in claim 1, wherein the global gap interval is scaled in inverse proportion to the capacity of said respective network access point to determine the local gap interval.

22. The system as in claim 20, wherein the global gap interval is scaled in inverse proportion to the capacity of said respective network access point to determine the local gap interval.

23. The method as claimed in claim 1, wherein the capacity of said respective network access point is determined based on a number of lines along which said respective network access point can communicate traffic with the communications network.

24. The system as in claim 20, wherein the capacity of said respective network access point is determined based on a number of lines along which said respective network access point can communicate traffic with the communications network.

* * * * *

UNITED STATES PATENT AND TRADEMARK OFFICE
CERTIFICATE OF CORRECTION

PATENT NO.       : 8,730,804 B2  
APPLICATION NO. : 10/588726  
DATED            : May 20, 2014  
INVENTOR(S)      : Hunt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this

Twenty-ninth Day of September, 2015

Michelle K. Lee  
*Director of the United States Patent and Trademark Office*